Figure 1:
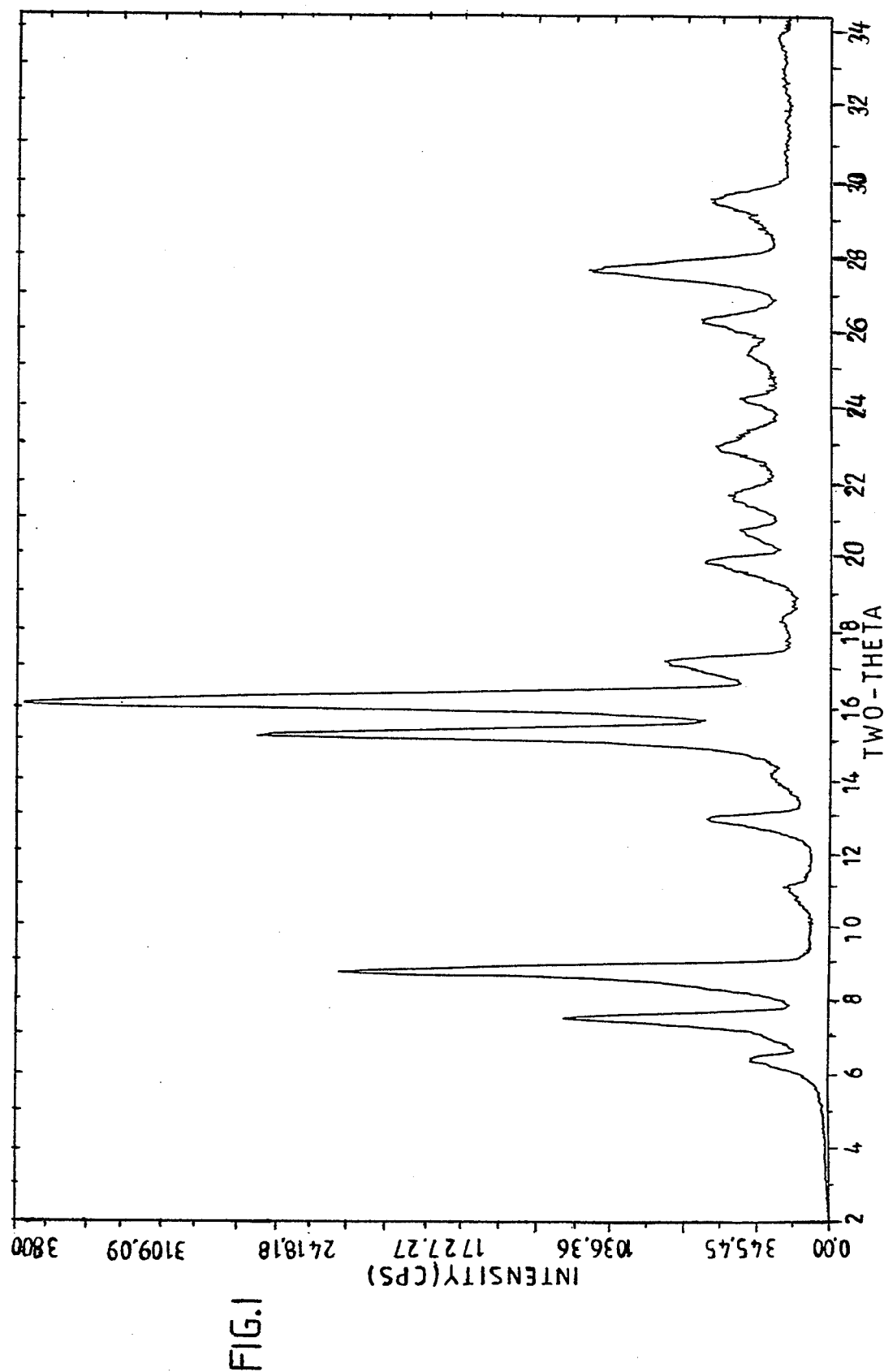

United States Patent [19]

Beck et al.

[11] Patent Number: 5,367,069
[45] Date of Patent: Nov. 22, 1994

[54] METAL-FREE, SUBSTITUTED PHTHALOCYANINES IN THE χ-MODIFICATION

[75] Inventors: Gunther Beck, Leverkusen; Bernd Kaletta, Langenfeld, both of Germany

[73] Assignee: Bayer Aktiengesellschaft, Leverkusen, Germany

[21] Appl. No.: 59,481

[22] Filed: May 10, 1993

[30] Foreign Application Priority Data

May 15, 1992 [DE] Germany ............................ 4216120

[51] Int. Cl.$^5$ ............................................. C09B 47/30
[52] U.S. Cl. ....................................................... 540/122
[58] Field of Search ........................................ 540/122

[56] References Cited

U.S. PATENT DOCUMENTS

| | | | |
|---|---|---|---|
| 3,357,989 | 12/1967 | Byrne et al. | 540/122 |
| 3,492,308 | 1/1970 | Brach et al. | 260/314.5 |
| 3,657,272 | 4/1972 | Brach et al. | 260/314.5 |
| 4,031,109 | 6/1977 | Griffiths et al. | 260/314.5 |
| 4,098,795 | 7/1978 | Griffiths et al. | 540/122 |
| 4,814,441 | 3/1989 | Hauser et al. | 540/122 |
| 4,946,762 | 8/1990 | Albert et al. | 540/122 |

FOREIGN PATENT DOCUMENTS 1189206 4/1970 United Kingdom .

OTHER PUBLICATIONS

*Chemical Abstracts*, vol. 105, No. 8; Columbus, Ohio; Abstract No. 62214, "High-purity x-type metal-free phthalocyanine", Kinoshita et al., JP 60,243,089 (Dainippon Ink), May 16, 1984.

J. H. Sharp and M. Lardon in "The Journal of Physical Chemistry", vol. 72, 1968, pp. 3230-3235.

*Primary Examiner*—Mukund J. Shah
*Assistant Examiner*—Pavanaram K. Sripada
*Attorney, Agent, or Firm*—Sprung Horn Kramer & Woods

[57] ABSTRACT

Metal-free phthalocyanines in the χ-modification substituted in up to four ortho positions can be prepared by tetramerisation of a reaction mixture consisting of phthalonitriles substituted in the 3-position with phthalonitrile in a molar ratio of 4:0 to 1:40 in the presence of a base and subsequent heat treatment at temperatures of between 100° and 300° C. They constitute excellent organic pigments.

4 Claims, 3 Drawing Sheets

METAL-FREE, SUBSTITUTED PHTHALOCYANINES IN THE χ-MODIFICATION

The invention relates to metal-free, substituted phthalocyanines in the χ-modification, a process for their preparations and their use as pigments.

Metal-free phthalocyanines are used in almost all areas as brilliant colour pigments. They exhibit good coloristic properties in combination with high fastness properties. This is due not least to a uniform crystal form. Mixtures of modifications and thermally labile crystal forms impair these qualities and limit the intended applications.

Apart from the α-, β- and γ-crystal form of metal-free phthalocyanines, a χ-modification of the unsubstituted phthalocyanine is also known, such as, for example, described in U.S. Pat. Nos. 3,357,989, 3,594,163, GB-A-1,280,843 or by J. H. Sharp and M. Lardon in "The Journal of Physical Chemistry" Vol. 72, 1968, p. 3230–3235. The χ-phase confers an interesting colour but is only obtained by milling of the α-modification for about one week. Moreover, in hot organic solvents, it undergoes complete rearrangement into the β-modification, as a result of which the coloristic properties of the χ-modification are lost.

Metal-free phthalocyanines in the χ-modification having the formula (I) have now been found

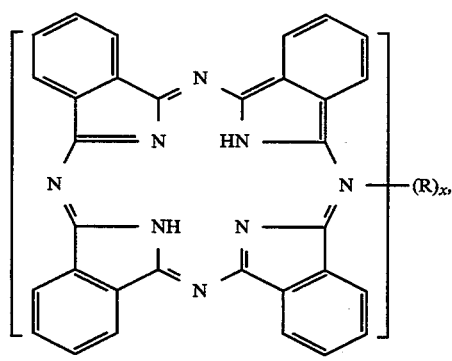

in which

R represents fluorine, chlorine, bromine, iodine, —CN, —NO$_2$, —CF$_3$, —OR$^2$, —SR$^2$, —COOR$^2$, —CON(R$^2$)(R$^3$), —N(R$^2$)(R$^3$), —N(R$_2$)CO(R$^3$) and C$_{1-C4}$-alkyl and is bound in the orthoposition of the aromatic rings, ortho positions being understood to mean the sites marked in formula (II) by arrows,

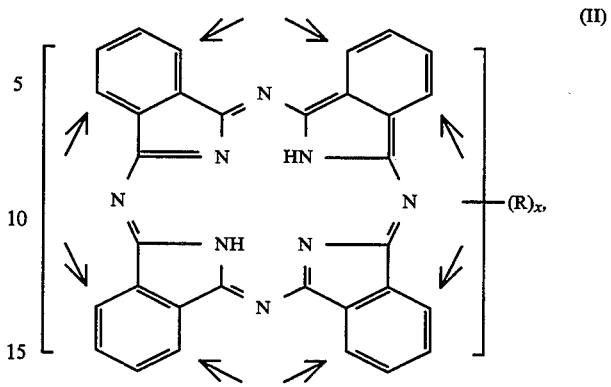

R$^2$ and R$^3$, independently of one another, represent hydrogen or C$_1$-C$_4$-alkyl, in particular methyl, ethyl and isopropyl and x is from 0.1 to 4.0, preferably 0.1 to 1.5, and represents a statistical degree of substitution.

Particularly suitable substituents R of the general formula (I) to be mentioned are —CN, —Cl, —Br, —OMe, —NO$_2$, methyl, ethyl and isopropyl, R in a particularly preferred embodiment representing cyano.

The phthalocyanines according to the invention of the formula (I) can be prepared by first reacting phthalonitriles substituted in the 3-position of the formula (III) with phthalonitrile of the formula (IV) in a molar ratio of 4:0 to 1:40 in the presence of a base at temperatures of 80°–300° C. in a suitable organic solvent, to give first the α-modification.

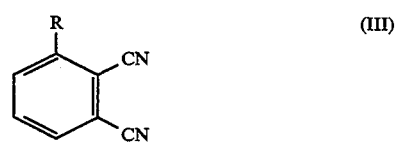

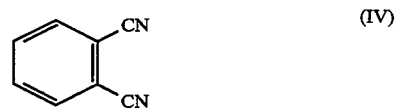

The substituted phthalonitriles of the formula (III) are known from the literature (e.g. R=—F CA—RN 65610-13-1, R=—Cl CA—RN 76241-79-7, R=—Br CA—RN 76241-80-0, R=—I CA—RN 76241-81-1, R=—CN CA—RN 38700-18-4, R=—NO$_2$ CA—RN 5162-67-5, R=—CF$_3$ CA—RN 64219-34-7, R=—O—Me CA—RN 19056-23-6, R=—O—Et CA—RN 116965-11-8, R=—NH$_2$ CA—RN 58632-96-5, R=—NMe$_2$ CA—RN 61109-17-9, R=—Me CA—RN 36715-97-6) or can be prepared by analogous processes.

Tetramerisation of the mixtures is carried out analogously to known processes, such as described, for example, by K. Venkataraman, "The Chemistry of Synthetic Dyes", Vol. II, Academic Press, Inc., New York, 1952, p. 1118–1142, or N. M. Bigelow and M. A. Perkins in Lubs Ed.), "The Chemistry of Synthetic Dyes and Pigments", Reinhold Publishing Corp., New York, 1955, p. 577–606, and in the literature cited there.

The α-form, which is either formed directly in the synthesis or is obtained from any other form by preparing a paste using sulphuric acid, is then converted to the χ-modification by a heat treatment in an inert organic solvent at a temperature of 100°–300° C.

Examples of suitable bases which can be used for preparing the phthalocyanines of the formula (I) are tertiary amines, such as 1,4-diazabicyclo[2.2.2]-octane, 1,8-diazabicyclo[5.4.0]-undec-7-ene, 1,5-diazabicyclo[4.3.0]-non-5-ene, sodium alkoxides, potassium alkoxide and lithium alkoxides of monohydric $C_1$–$C_{12}$ alcohols, such as methanol, ethanol, isopropanol, butanol, pentanol, and the like, or of dihydric $C_2$–$C_{12}$-alcohols, such as ethylene glycol and the like.

Examples of organic solvents suitable for tetramerisation of (III) and (IV) are the alcohols themselves already listed under the bases, aprotic dipolar organic solvents, for example N,N-di-$C_1$-$C_4$-alkylamides of aliphatic $C_1$–$C_6$-carboxylic acids, such as N,N-dimethylformamide, N,N-diethylformamide, N-methylpyrrolidinone, N-methylcaprolactam; aliphatic sulphoxides, such as dimethyl sulphoxide, aliphatic sulphones, such as dimethyl sulphone and tetramethylene sulphone; furthermore, tetramethylurea, N,N'-dimethyl-1,3-imidazolidin-2-one and hexamethylphosphoramide.

The reaction can take place at temperatures of 80°–300° C., preferably at 80°–200 C. Tetramerisation of the substituted phthalonitrile of the formula (III) with the phthalonitrile of the formula (IV) is preferably carried out at a molar ratio of 1:3 to 1:40.

The reaction is complete when no more educt can be detected by thin-layer chromatography.

Solvents suitable for converting the initially formed α-modification into the χ-modification according to the invention of the formula (I) are in particular organic solvents, for example alcohols, phenols, dipolar aprotic solvents, such as dimethylformamide, dimethylacetamide, dimethyl sulphoxide, N-methylpyrrolidone, and, preferably, aliphatic or aromatic hydrocarbons which are unsubstituted or may be substituted by alkyl, acyl, alkoxy, halogen, ester or nitro groups, such as decaline, xylene, mesitylene, chlorobenzene, dichlorobenzene, trichlorobenzene, naphthalene, 1-methylnaphthalene, methyl benzoate, 2-methylnaphthalene, 1-chloronaphthalene, 2-chloronaphthalene, and heterocyclic solvents, such as pyridine, picoline, quinoline, which are substituted or unsubstituted.

Conversion of the α- into the χ-modification takes place at a temperature of 100°–300° C. preferably at 150°–250° C.

Preference is given to a one-step variant of the preparation in which the compounds of the formula (I) are obtained directly, without a separate heat treatment, in the χ-modification by reaction of (III) with (IV) in a molar ratio of 4:0 to 1:40, preferably 1:3 to 1:40, in the presence of a base at a temperature of 150°–250° C. in a suitable organic solvent.

Suitable bases which can be used for this one-step process variant are tertiary amines, such as 1,4-diazabicyclo[2.2.2]-octane, 1,8-diazabicyclo[5.4.0]-undec-7-ene, 1,5-diazabicyclo[4.3.0]-non-5-ene and the like.

Suitable solvents for this one-step process variant are hydroxyalkylaromatics, such as benzyl alcohol, 1- and 2-phenylethanol, hydroxymethylnaphthalenes and many more. Mixtures of alcohols and aromatics are also suitable solvents for the one-step process variant.

The designation χ-modification of metal-free phthalocyanines denotes crystal forms which, on the one hand, are distinguished by their spectroscopic properties, for example by a strong absorption maximum at about 800 nm in the visible and near IR range, and, on the other hand, differ from the already known α-, β- and ι-modifications by two strong signals at the Bragg angles (2θ) of about 7° and 9°.

Surprisingly, it has now been found that the phthalocyanines according to the invention of the formula (I) are stable in the χ-modification and do not undergo a thermalphase transition, such as is observed in the case of the unsubstituted phthalocyanine in the χ-modification. Accordingly, the phthalocyanines according to the invention of the formula (I) have the suprising advantage that their useful shades are maintained by the thermal phase stability, thus resulting in excellent fastness properties. Compared with the already known unsubstituted phthalocyanine in the χ-modification, such as is described in U.S. Pat. No. 3,357,989, which can only be obtained by milling the α-modification for one week, the phthalocyanines according to the invention of the formula (I) are moreover much more readily available. Thus, the conversion of the α- into the χ-modification is already complete after a few hours and thus gives a much better space-time yield.

The phthalocyanines according to the invention of the formula (I) can be used for the preparation of pigmented systems having excellent fastness properties, such as mixtures with other substances, preparations, surface coatings, printing inks, coloured paper and coloured macromolecular substances. Mixtures with other substances can be understood to mean, for example, those with inorganic white pigments, such as titanium dioxide (rutile). Examples of preparations are flushed pastes containing organic liquids and, if desired, preservatives. The designation surface coatings denotes, for example, physically or oxidatively drying coatings, stoving enamels, reaction finishes, two-component finishes, emulsion paints for weather-resistant coats and distempers.

Printing inks are understood to mean those used for paper, textile and tin plate printing. The phthalocyanines (I) according to the invention are suitable in particular for the pigmenting of macromolecular organic substances.

The macromolecular substances can be of natural origin, such as rubber, can be obtained by chemical modification, such as acetylcellulose, cellulose butyrate or viscose, or can be produced synthetically, such as chain and step growth polymers. Examples which may be mentioned are thermoplastic polymers, such as polyvinyl chloride, polyvinyl acetate, polyvinyl propionate, superpolyamides, polymers and copolymers of acrylic esters and/or methacrylic esters, acrylamide, butadiene, styrene and polyurethanes and polycarbonates. The substances pigmented with the phthalocyanines according to the invention of the formula (I) can be present in any desired form.

Owing to their high transparency and weather resistance, the phthalocyanines (I) according to the invention are suitable in particular for use in automotive coatings, in particular for metallic finishes.

The phthalocyanines (I) according to the invention have excellent water fastness, oil fastness, acid fastness, lime fastness, alkali fastness, solvent fastness, overcoating fastness, overspraying fastness, sublimation fastness, heat resistance, vulcanisation resistance, are high yielding, can be readily processed in plastic compositions and have in particular excellent weather, light and migration fastness.

Furthermore, the invention finally relates to the use of the phthalocyanines (I) as colour pigments.

Percentages and parts of the examples which follow are by weight.

EXAMPLE 1

3.9 parts of 1,2,3-tricyanobenzene and 9.6 parts of phthalonitrile are dissolved in 100 parts of amyl alcohol. 9 parts of a 30 % strength methanolic sodium methoxide solution are added, and the mixture is refluxed for 6 hours. The resulting product is filtered off with suction and stirred in 100 parts of 10% strength HCl solution. The product is filtered off with suction, washed with water until neutral and dried in a drying cabinet. The $\alpha$-Pc(ortho-CN)$_{1.00}$ thus obtained is refluxed in 100 parts of 1-methylnaphthalene for 10 hours. The product is filtered off with suction, washed with methanol and dried in a drying cabinet to give 10.1 parts of $\chi$-Pc(ortho-CN)$_{1.00}$. The X-ray diffraction diagram is shown in FIG. 1.

The following 1-substituted phthalocyanines (I) in the $\chi$-modification are obtained by the process mentioned in Example 1 by using the corresponding amounts of 3-substituted phthalonitriles (III) and phthalonitrile (IV):

| Example | $R^1$ in formula III | Molar ratio III:IV | Product |
|---|---|---|---|
| 2 | —CN | 1:7 | $\chi$-PC-(ortho-CN)$_{0.50}$ |
| 3 | —CN | 1:11 | $\chi$-PC-(ortho-CN)$_{0.33}$ |
| 4 | —CN | 1:32 | $\chi$-PC-(ortho-CN)$_{0.12}$ |
| 5 | —Cl | 1:3 | $\chi$-PC-(ortho-Cl)$_{1.00}$ |
| 6 | —Cl | 1:7 | $\chi$-PC-(ortho-Cl)$_{0.50}$ |
| 7 | —Br | 1:5 | $\chi$-PC-(ortho-Br)$_{0.67}$ |
| 8 | —Me | 1:4 | $\chi$-PC-(ortho-Me)$_{0.80}$ |
| 9 | —Me | 1:3 | $\chi$-PC-(ortho-Me)$_{1.00}$ |
| 10 | —OMe | 1:7 | $\chi$-PC-(ortho-OMe)$_{0.50}$ |
| 11 | —NO$_2$ | 1:4 | $\chi$-PC-(ortho-NO$_2$)$_{0.80}$ |
| 12 | —NO$_2$ | 1:7 | $\chi$-PC-(ortho-NO$_2$)$_{0.50}$ |

Figure 2:
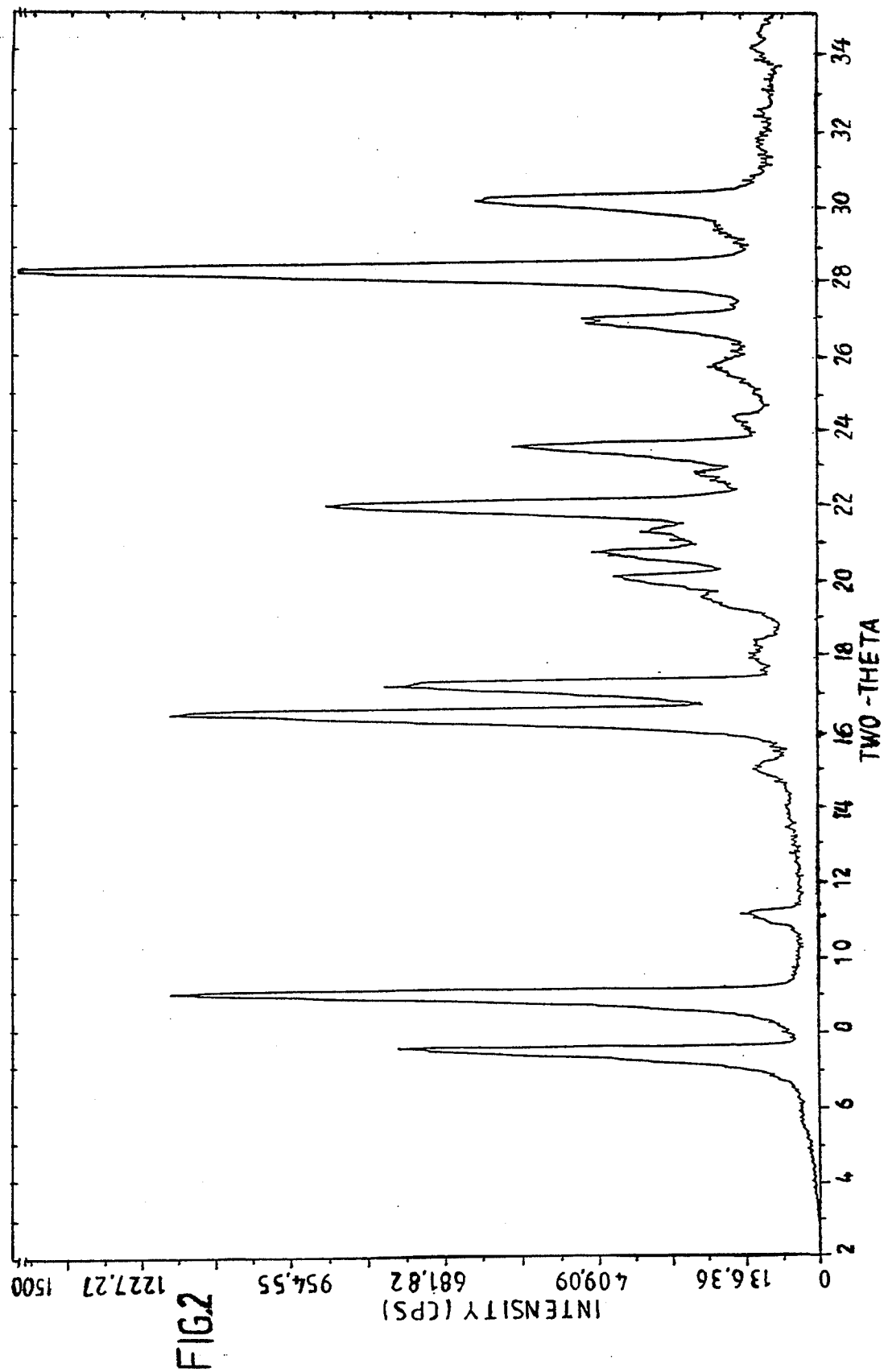
Figure 3:
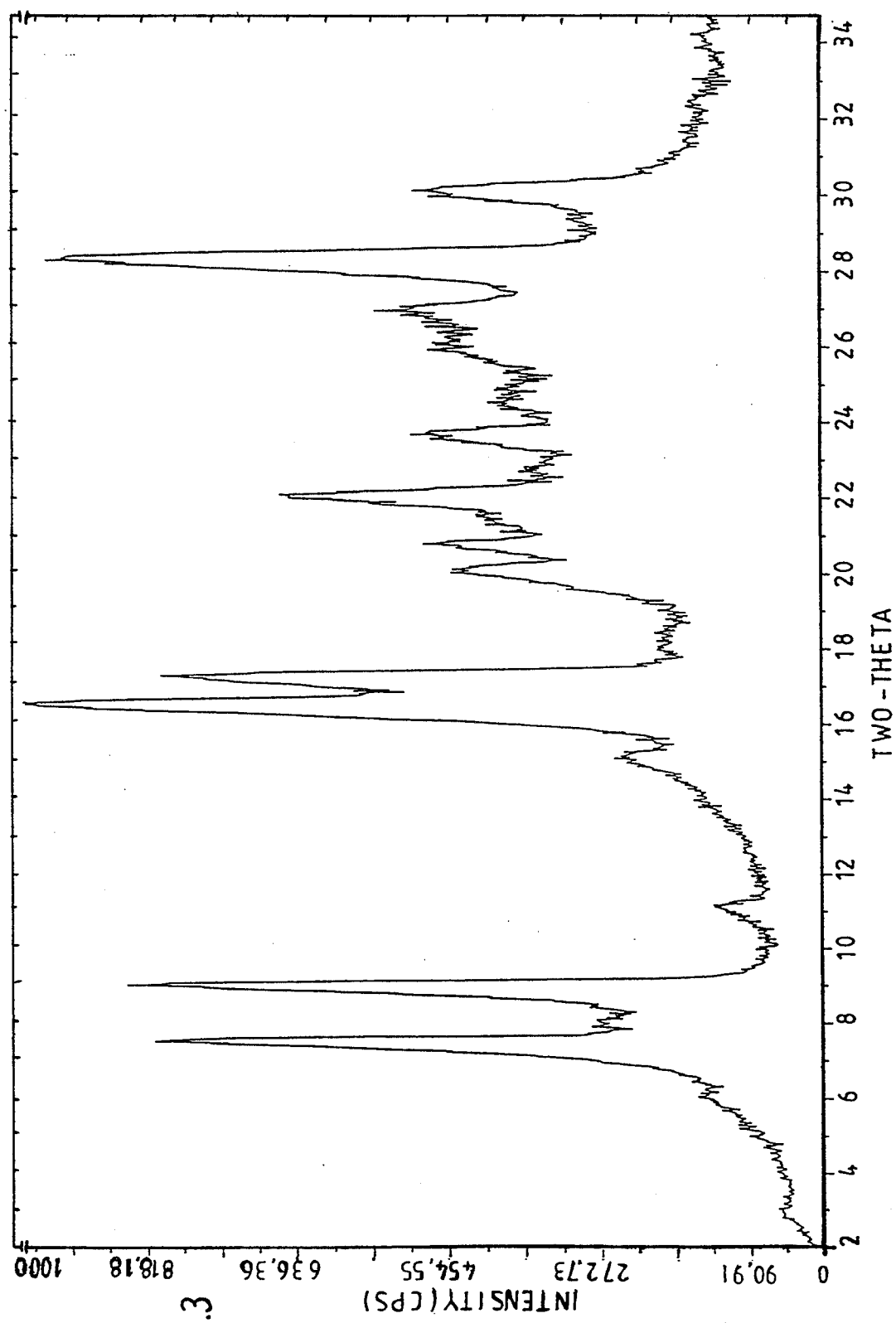

The X-ray diffraction diagrams of Examples 2 and 11 are shown in FIGS. 2 and 3, respectively.

EXAMPLE 13

0.78 part of 1,2,3-tricyanobenzene and 12.16 parts of phthalonitrile are dissolved in 100 parts of benzyl alcohol. 6.9 parts of 1,5-diazabicyclo[4.3.0]-non-5-ene are added, and the mixture is refluxed for 12 hours. The resulting product is filtered off with suction, washed with methanol and dried at 50° C. in a drying cabinet, giving 6.6 parts of $\chi$-PC(ortho-CN)$_{0.2}$.

Application 1

Pigmented stoving enamel 8 g of finely milled pigment according to Example 1 are dispersed in 92 g of a stoving enamel of the following composition:

33% of alkyd resin
15% of melamine/formaldehyde resin
5% of glycol monomethyl ether
34% of xylene
13% of butanol Suitable alkyd resins are products based on synthetic and vegetable fatty acid, such as coconut oil, castor oil, dehydrated castor oil, linseed oil and others. Instead of melamine/formaldehyde resins, it is possible to use urea/formaldehyde resins.

After dispersion has taken place, the pigmented enamel is applied separately to a sheet of paper, glass, plastic and metal and stoved at 130° C. for 30 minutes.

The coated sheets show very good light and weather resistance and good overcoating fastness.

Application 2

Pigmented thermoplastics 0.2 g of finely milled pigment according to Example 1 is mixed with 100 g each of polyethylene, polypropylene and polystyrene granules. The corresponding mixtures are either directly injection moulded in an injection moulding machine at 220° to 280° C. or processed in an extruder to give coloured rods or on mixing rolls to give coloured hides. If desired, the rods or hides are granulated and injection-moulded in an injection-moulding machine.

The blue moulded articles have very good light and migration fastness. Synthetic polyamides obtained from caprolactam or from adipic acid and hexamethylenediamine or polyethylene terephthalate can be coloured similarly at 280° to 300° C., if appropriate under a nitrogen atmosphere.

Application 3

Pigmented printing ink

Blue offset prints of high brilliance and colour strength and very good light and coating fastness properties are obtained using a printing ink prepared by milling 35 g of finely milled pigment according to Example 1 with 65 g of linseed oil and addition of 1 g of siccative (cobalt naphthenate, 50% strength in white spirit). Use of this printing ink in book, photographic, lithographic or steel-engraving printing gives blue prints having similar fastness properties. When used for the colouring of tin plate prints or intaglio prints or low-viscosity printing inks, the pigment gives blue prints having similar fastness properties.

What is claimed is:

1. A metal-free phthalocyanine in the $\chi$-modification having the formula

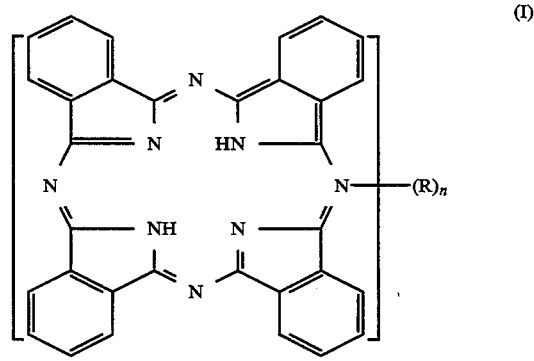

(I)

in which
R represents fluorine, chlorine, bromine, iodine, —CN, —NO$_2$, —CF$_3$, OR$^2$, —SR$^2$, —COOR$^2$, —CON (R$^2$) (R$^3$), -N (R) (R), and C$_1$-C$_4$-alkyl, and is bound in the ortho position, and
R$^2$ and R$^3$, independently of each other, represent hydrogen or C$_1$-C$_4$-alkyl, and
n is from 0.1 to 4.0 and represents a statistical degree of substitution.

2. The phthalocyanine according to claim 1, in which is from 0.1 to 1.5.

3. The phthalocyanine according to claim 1, in which R represents —CN, —Cl, —BF, —Me, —NO$_2$ and methyl.

4. The phthalocyanine according to claim 1, in which R represents cyano.

* * * * *

UNITED STATES PATENT AND TRADEMARK OFFICE
CERTIFICATE OF CORRECTION

PATENT NO.   : 5,367,069
DATED        : November 22, 1994
INVENTOR(S)  : Beck, et al.

It is certified that error appears in the above-indentified patent and that said Letters Patent is hereby corrected as shown below:

Col. 6, line 56   Delete " -N(R)(R), " and substitute
                  -- -N($R^2$)($R^3$), -N($R^2$)CO($R^3$) --

Col. 6, line 62   Before " is " insert -- n --

Col. 6, line 64   Delete "-BF, -Me, " and substitute
                  -- Br, -OMe, --

Signed and Sealed this

Second Day of December, 1997

Attest:

BRUCE LEHMAN

*Attesting Officer*        Commissioner of Patents and Trademarks